Jan. 1, 1952

T. CLARK ET AL 2,581,239

HYDRAULIC TORQUE METER

Filed Nov. 10, 1947

Inventor
THOMAS CLARK
& HENRY E. HARVEY
by Mawhinney & Mawhinney
Attorneys

Patented Jan. 1, 1952

2,581,239

UNITED STATES PATENT OFFICE 2,581,239

HYDRAULIC TORQUE METER

Thomas Clark and Henry E. Harvey, Coventry, England, assignors to Armstrong Siddeley Motors Limited, Coventry, England Application November 10, 1947, Serial No. 785,080
In Great Britain August 30, 1947

3 Claims. (Cl. 73—136)

This invention relates to a hydraulic torque meter of the kind in which a reaction member, for the torque, is held substantially stationary by a hydraulic device having two relatively movable coacting elements between which operating liquid is supplied from a source of constant pressure (which is at least as high as that in the device in conditions of maximum torque) through an inlet valve controlled by the relative movement of the two elements of the device, such that the pressure in the device varies responsively to the torque and can be read by a pressure gauge—which may be calibrated to indicate torque.

An hydraulic torque meter of this character is disclosed in U. S. Specification No. 2,444,363 filed August 30, 1944 in the name of Philip Putney Newcombe.

The present invention essentially consists in providing the hydraulic device, which, by its nature must have an inherent leak, with, in addition, a positive leak which is arranged so as not to be operative in conditions of forward torque. Thus, when passing from no torque to reverse torque conditions, as may happen with an aircraft propeller engine, the meter will not in any way influence the operation of a reverse torque switch such as is commonly arranged to be operable by the movable element of the hydraulic device—a very important feature in the case of an aircraft propeller gas turbine engine.

Figure 1:
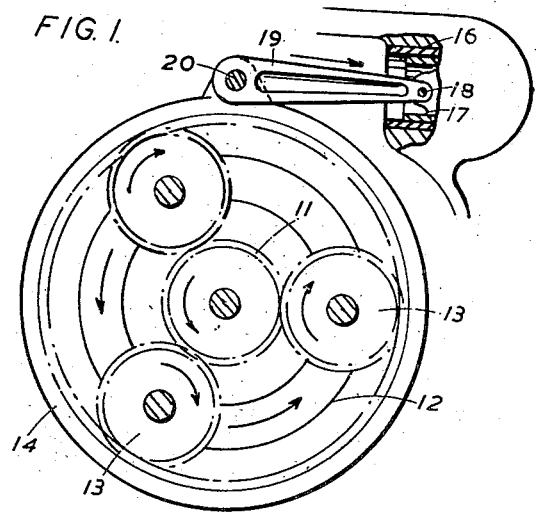
Figure 2:
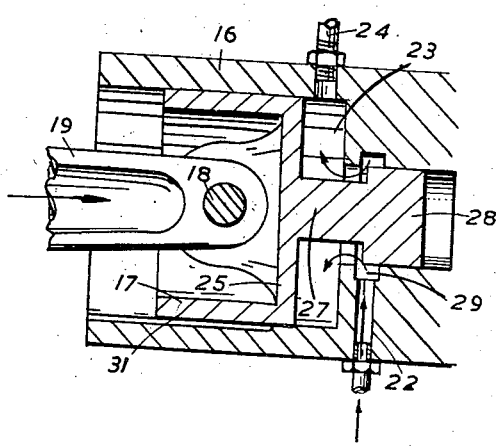

In the accompanying drawings:

Figure 1 is a part-sectional elevation of one form of hydraulic torque meter according to the invention; and Figure 2 is a fragmentary sectional elevation, to a larger scale, of the hydraulic device.

Figure 1 shows a torque meter for an internal-combustion turbine plant, though it will be obvious that it could be used for measuring the torque of some other prime mover, of the kind including a planetary gearing having a driving sun gear 11, a driven planet carrier indicated at 12 and supporting in this case three planets 13, 13, and an internally-toothed annulus 14 serving as the reaction member.

The relatively-movable coacting elements of the hydraulic device include a stationary cylinder 16 and a piston 17 which is slidable therein, the piston being hinged at 18 to a link 19 by which the torque thrust is transmitted from the internally-toothed annulus 14 through a pin 20 carried by the latter.

The hydraulic device is supplied with oil or other hydraulic liquid at constant pressure. As will be well understood, use may be made for this purpose of a constant-pressure pump, or of an ordinary pump working in association with a by-pass circuit having an appropriate form of pressure-relief valve. It is desired that the pressure supplied should be in excess of that pressure which is required in the cylinder 16 to balance the maximum torque of the internal-combustion turbine plant. The constant pressure is delivered to the inlet passage 22.

Figure 2 shows the parts in the approximate position for maximum torque, the torque being balanced by the pressure of the hydraulic fluid in the operative space 23 of the hydraulic device between the plunger 17 and the end of the cylinder. This space is at all times in connection with a pipe 24 leading to a pressure gauge which will record the pressure (and therefore the torque) at any moment and which may, if desired, be calibrated in torque.

It will be appreciated that at all times there must be some leak between the plunger and the cylinder wall and there is, therefore, a continuous supply of hydraulic liquid which is governed by such leak and is, in consequence, a very small one. A definite small leak would be provided through the piston head if leakage between the piston and cylinder wall were insufficient.

As the torque being measured decreases the thrust on the plunger due to the hydraulic liquid in the operative space 23 preponderates over that applied to the plunger by the thrust link 19, and in consequence the plunger moves back, i. e., to the left in Figure 2. The plunger is formed with an axial stem 27 having a head 28 working in an opening in the end wall of the cylinder 16, and the head 28 co-operates as a piston or slide valve with a port 29, which is shown as being annular and to which the inlet 22 leads. The port 29 is thus closed to a greater or less extent dependently upon the extent to which the torque thrust has fallen off. The increased pressure drop across the port 29 in these conditions results in a lower pressure in the operative space 23 which will be recorded on the pressure gauge.

In conditions of no torque the plunger will be moved back for the head 28 fully to close the annular port 29, and in conditions of reverse torque the operative space 23, after a small movement of the plunger beyond the no torque position, becomes positively vented along the leak 31.

Very accurate measurements can be obtained by means of the torque meter of the invention, and only a small quantity of hydraulic liquid is used or circulated.

What we claim as our invention and desire to secure by Letters Patent of the United States is:

1. A hydraulic torque meter including a reaction member receiving the torque thrust to be measured, a hydraulic device for holding said reaction member substantially immobile at any given torque thrust, means for supplying hydraulic liquid at constant pressure, said device having relatively movable coacting elements arranged to provide a small continuous leak of hydraulic liquid from the operative space between said coacting elements, valve means controlled by relative movement of said coacting elements for regulating the flow of the hydraulic liquid to said operative space, and a pressure gauge connected to read the pressure in said operative space, one of said coacting elements having in it a venting passage which is positioned relatively to the other of said coacting elements so as to be connected with said operative space only when said coacting elements have been moved relatively to one another to be in positions in which said valve means is fully closed.

2. A hydraulic torque meter including a movable reaction member to receive the torque thrust to be measured, a stationary cylinder with a closed end, a plunger movable in said cylinder with a very small leak and connected to said reaction member, a supply of hydraulic liquid at constant pressure, a port in said cylinder through which the hydraulic liquid can be supplied to the operative space between said plunger and the closed end of said cylinder to hold said reaction member stationary at any given torque thrust, a slide valve operable by said plunger and controlling said port, and a pressure gauge connected to read the pressure in said operative space, said cylinder having in it a venting passage positioned relatively to said plunger so as to be connected to said operative space only when said plunger has been moved to a position in which said valve closes said port.

3. A hydraulic torque meter including a movable reaction member receiving the torque thrust to be measured, a stationary cylinder with a closed end having it in a recess, a plunger movable in said cylinder with a very small leak and connected to said reaction member, a supply of hydraulic liquid at constant pressure, a port in said cylinder communicating with said recess and through which the hydraulic liquid can be supplied to the operative space between said plunger and the closed end of said cylinder, a projection on said plunger engaged in said recess and coacting with said port, and a pressure gauge connected to read the pressure in said operative space, said cylinder having in it a venting passage positioned relatively to said plunger so as to be connected to said operative space only when said plunger has been moved to a position in which said projection closes said port.

THOMAS CLARK.
HENRY E. HARVEY.

REFERENCES CITED

The following references are of record in the file of this patent:

UNITED STATES PATENTS

| Number | Name | Date |
|---|---|---|
| 2,154,489 | Buck | Apr. 18, 1939 |
| 2,289,285 | Chilton | July 7, 1942 |
| 2,444,363 | Newcomb | June 29, 1948 |